(12) United States Patent
Koga et al.

(10) Patent No.: US 10,566,867 B2
(45) Date of Patent: Feb. 18, 2020

(54) STATOR AND METHOD OF MANUFACTURING STATOR

(71) Applicant: AISIN AW CO., LTD., Anjo-shi, Aichi-ken (JP)

(72) Inventors: Kiyotaka Koga, Nishio (JP); Shingo Hashimoto, Okazaki (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 115 days.

(21) Appl. No.: 15/579,782

(22) PCT Filed: Jul. 19, 2016

(86) PCT No.: PCT/JP2016/071147
§ 371 (c)(1),
(2) Date: Dec. 5, 2017

(87) PCT Pub. No.: WO2017/014217
PCT Pub. Date: Jan. 26, 2017

(65) Prior Publication Data
US 2018/0175689 A1 Jun. 21, 2018

(30) Foreign Application Priority Data
Jul. 23, 2015 (JP) .................. 2015-146223

(51) Int. Cl.
*H02K 3/12* (2006.01)
*H02K 15/06* (2006.01)
*H02K 15/085* (2006.01)

(52) U.S. Cl.
CPC ............ *H02K 3/12* (2013.01); *H02K 15/066* (2013.01); *H02K 15/085* (2013.01); *H02K 2213/03* (2013.01)

(58) Field of Classification Search
CPC ........ H02K 3/12; H02K 15/085; H02K 15/02; H02K 15/066; H02K 2213/03; H02K 1/16; H02K 3/28; H02K 15/0068
See application file for complete search history.

(56) References Cited

U.S. PATENT DOCUMENTS

| 9,906,085 | B2 * | 2/2018 | Nakamura | ............... H02K 3/12 |
| 2008/0201935 | A1 * | 8/2008 | Nakayama | ........... H02K 15/045 |
| | | | | 29/596 |
| 2013/0014381 | A1 * | 1/2013 | Kayukawa | ............... H02K 3/28 |
| | | | | 29/596 |

FOREIGN PATENT DOCUMENTS

| JP | 2008-104293 A | 5/2008 |
| JP | 2009-195011 A | 8/2009 |

(Continued)

OTHER PUBLICATIONS

Oct. 4, 2016 International Search Report issued in International Patent Application No. PCT/JP2016/071147.

(Continued)

*Primary Examiner* — Quyen P Leung
*Assistant Examiner* — Leda T Pham
(74) *Attorney, Agent, or Firm* — Oliff PLC

(57) ABSTRACT

A stator that includes a core formed by stacking annular steel sheets on each other and having teeth and slots provided between the teeth; and a plurality of continuous coils each continuously formed from a single conductor wire and each having a plurality of slot housed portions to be housed in the slots which are different from each other, a coil end portion on one side in an axial direction that connects the slot housed portions to each other, and a coil end portion on the other side in the axial direction that connects the slot housed portions to each other.

11 Claims, 5 Drawing Sheets

(56) References Cited

FOREIGN PATENT DOCUMENTS

| JP | 2012-125043 A | 6/2012 |
| JP | 2013-187951 A | 9/2013 |
| JP | 2014-193038 A | 10/2014 |
| WO | 2012/137306 A1 | 10/2012 |

OTHER PUBLICATIONS

Apr. 5, 2018 European Search Report issued in Patent Application No. 16827777.0.

\* cited by examiner

STATOR AND METHOD OF MANUFACTURING STATOR

BACKGROUND

The present disclosure relates to a stator and a method of manufacturing a stator.

There has hitherto been known a stator that includes a core formed by stacking annular steel sheets on each other and a coil housed in slots of the core. Such a stator is disclosed in Japanese Patent Application Publication No. 2012-125043 (JP 2012-125043 A), for example.

In the stator described in JP 2012-125043 A, a plurality of coaxially wound coils obtained by continuously winding (coaxially winding) a single conductive wire are housed in slots of a core formed by stacking annular steel sheets on each other. In the coaxially wound coils, a coil end portion on one side in the axial direction is formed to extend straight along the axial direction as seen in the radial direction. Meanwhile, a coil end portion on the other side in the axial direction is bent so as to project toward the radially inner side of the stator. Consequently, portions of the plurality of conductor wires, which constitute the coil end portion, that are bent radially inward are disposed so as to be stacked on each other in the axial direction of the stator. The coaxially wound coils are housed in the slots when the coaxially wound coils are moved along the axial direction from the side of the coil end on the other side (the coil end portion side which is bent).

SUMMARY

In the stator described in JP 2012-125043 A, however, portions of the plurality of conductor wires, which constitute the coil end portion, that are bent radially inward are disposed so as to be stacked on each other along the axial direction on the other side in the axial direction. Therefore, the length of the coil end portion of the coaxially wound coils in the axial direction is disadvantageously large compared to coaxially wound coils in which a coil end portion is not bent (coaxially wound coils in which a plurality of conductor wires that constitute a coil end portion are stacked on each other along the radial direction). This may increase the length of the stator in the axial direction.

An exemplary aspect of the disclosure provides a stator, the length of which in the axial direction can be prevented from being increased.

According to a first exemplary aspect of the present disclosure, a stator includes: a core formed by stacking annular steel sheets on each other and having teeth and slots provided between the teeth; and a plurality of continuous coils each continuously formed from a single conductor wire and each having a plurality of slot housed portions to be housed in the slots which are different from each other, a coil end portion on one side in an axial direction that connects the slot housed portions to each other, and a coil end portion on the other side in the axial direction that connects the slot housed portions to each other, in which: the coil end portion of a first continuous coil and the coil end portion of a second continuous coil to be housed in the slots which are adjacent to each other in a circumferential direction, of the plurality of continuous coils, are each provided with an offset portion in which the conductor wire is bent in a radial direction of the stator so as to be offset in the radial direction by a width corresponding to one conductor wire; and a clearance in the circumferential direction between the slot housed portion of the first continuous coil and the slot housed portion of the second continuous coil after the first continuous coil and the second continuous coil are housed in the slots is larger than a clearance in the circumferential direction between the slot housed portion of the first continuous coil and the slot housed portion of the second continuous coil before the first continuous coil and the second continuous coil are housed in the slots. Here, the "continuous coil" does not include a segment coil (a coil obtained by inserting a plurality of conductor wires, which are each provided with a coil end portion on one side in the axial direction but which are each not provided with a coil end portion on the other side, into slots and thereafter connecting the conductor wires to each other by welding), but includes a coaxially wound coil and a wave wound coil.

In the stator according to the first exemplary aspect of the present disclosure, as described above, the clearance in the circumferential direction between the slot housed portion of the first continuous coil and the slot housed portion of the second continuous coil after the first continuous coil and the second continuous coil are housed in the slots is larger than the clearance in the circumferential direction between the slot housed portion of the first continuous coil and the slot housed portion of the second continuous coil before the first continuous coil and the second continuous coil are housed in the slots. Consequently, the first continuous coil and the second continuous coil can be moved from the radially inner side toward the radially outer side to be inserted into the slots, which extend radially toward the radially outer side, while gradually increasing the clearance in the circumferential direction between the slot housed portion of the first continuous coil and the slot housed portion of the second continuous coil. That is, the first continuous coil and the second continuous coil can be inserted into the slots with the plurality of conductor wires, which constitute the coil end portion, stacked on each other along the radial direction without bending the coil end portions of the first continuous coil and the second continuous coil so as to project toward the radially inner side of the stator. As a result, an increase in length of the first continuous coil and the second continuous coil in the axial direction can be prevented, and thus an increase in length of the stator in the axial direction can be prevented.

According to a second exemplary aspect of the present disclosure, a method of manufacturing a stator includes the steps of: a step of disposing a first continuous coil and a second continuous coil on a radially inner side of a core, the core being formed by stacking annular steel sheets on each other and having teeth and slots provided between the teeth, the first continuous coil and the second continuous coil each being continuously formed from a single conductor wire to be housed in the slots which are adjacent to each other in a circumferential direction and each including a plurality of slot housed portions to be housed in the slots which are different from each other, a coil end portion on one side in an axial direction that connects the slot housed portions to each other, and a coil end portion on the other side in the axial direction that connects the slot housed portions to each other, and the coil end portions each being provided with an offset portion in which the conductor wire is bent in a radial direction of the stator so as to be offset in the radial direction by a width corresponding to one conductor wire; and moving the first continuous coil and the second continuous coil from the radially inner side toward a radially outer side to be inserted into the slots which are adjacent to each other in the circumferential direction such that a clearance in the circumferential direction between the slot housed portion of the first continuous coil and the slot housed portion of the second continuous coil after the first continuous coil and the second continuous coil are housed in the slots is larger than a clearance in the circumferential direction between the slot housed portion of the first continuous coil and the slot housed portion of the second continuous coil before the first continuous coil and the second continuous coil are housed in the slots, while maintaining a state in which an overall width of the offset portion is disposed in a range of a sector centered on a center of the core and having a center angle θ determined by the following formula (4) (θ=360/n . . . (4)) as viewed in the axial direction in the case where the number of the slots is defined as n. Here, the "continuous coil" does not include a segment coil (a coil obtained by inserting a plurality of conductor wires, which are each provided with a coil end portion on one side in the axial direction but which are each not provided with a coil end portion on the other side, into slots and thereafter connecting the conductor wires to each other by welding), but includes a coaxially wound coil and a wave wound coil.

As described above, the method of manufacturing a stator according to the second exemplary aspect of the present disclosure includes the steps of: moving the first continuous coil and the second continuous coil from the radially inner side toward the radially outer side to be inserted into the slots which are adjacent to each other in the circumferential direction such that the clearance in the circumferential direction between the slot housed portion of the first continuous coil and the slot housed portion of the second continuous coil after the first continuous coil and the second continuous coil are housed in the slots is larger than the clearance in the circumferential direction between the slot housed portion of the first continuous coil and the slot housed portion of the second continuous coil before the first continuous coil and the second continuous coil are housed in the slots. Consequently, the first continuous coil and the second continuous coil can be moved from the radially inner side toward the radially outer side to be inserted into the slots, which extend radially toward the radially outer side, while gradually increasing the clearance in the circumferential direction between the slot housed portion of the first continuous coil and the slot housed portion of the second continuous coil. That is, the first continuous coil and the second continuous coil can be inserted into the slots with the plurality of conductor wires, which constitute the coil end portion, stacked on each other along the radial direction without bending the coil end portions of the first continuous coil and the second continuous coil so as to project toward the radially inner side of the stator. As a result, an increase in length of the first continuous coil and the second continuous coil in the axial direction can be prevented, which allows providing a method of manufacturing a stator that makes it possible to prevent an increase in length of the stator in the axial direction.

With regard to the present application, other configurations such as those described below are also conceivable besides the stator according to the first exemplary aspect and the method of manufacturing a stator according to the second exemplary aspect.

(Additional Features)

That is, another configuration of the present application provides a stator including: a core formed by stacking annular steel sheets on each other and having teeth and slots provided between the teeth; and a plurality of continuous coils each continuously formed from a single conductor wire and each having a plurality of slot housed portions to be housed in the slots which are different from each other, a coil end portion on one side in an axial direction that connects the slot housed portions to each other, and a coil end portion on the other side in the axial direction that connects the slot housed portions to each other, in which: the coil end portion of a first continuous coil and the coil end portion of a second continuous coil to be housed in the slots which are adjacent to each other in a circumferential direction, of the plurality of continuous coils, are each provided with an offset portion in which the conductor wire is bent in a radial direction of the stator so as to be offset in the radial direction by a width corresponding to one conductor wire; and in the case where a distance from the center of the core to end portions of the teeth on a radially inner side as viewed in the axial direction is defined as R, a width of the coil end portion in the radial direction as viewed in the axial direction is defined as B, the number of the slots is defined as n1, and the number of turns of the continuous coils which are disposed in the slots is defined as n2, a width A of the offset portion in the circumferential direction meets the following formula (6):

$$A \leq 2 \times \pi \times (R-(B\times(n2-1)))/n1 \qquad (6)$$

According to the present disclosure, as described above, an increase in length of the stator in the axial direction can be prevented.

BRIEF DESCRIPTION OF THE DRAWINGS

FIGS. 5A and 5B illustrate the coaxially wound coil according to the embodiment of the present disclosure, in which FIG. 5A is a view as seen in the axial direction and FIG. 5B is a view as seen in the radial direction.

DETAILED DESCRIPTION OF EMBODIMENTS

An embodiment of the present disclosure will be described below with reference to the drawings.

Embodiment (Structure of Stator)

The structure of a stator 100 according to an embodiment will be described with reference to FIGS. 1 to 7.

Figure 1:
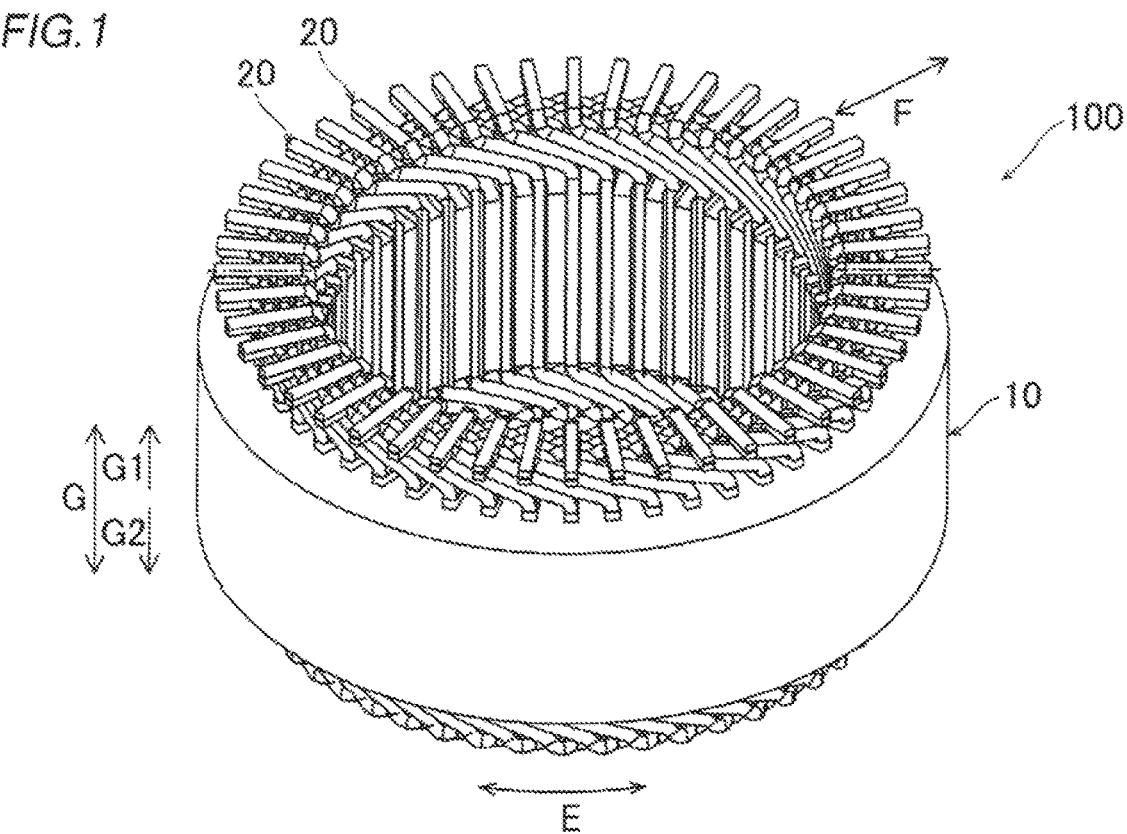
FIG. 1 is a perspective view of a stator according to an embodiment of the present disclosure.
Figure 2:
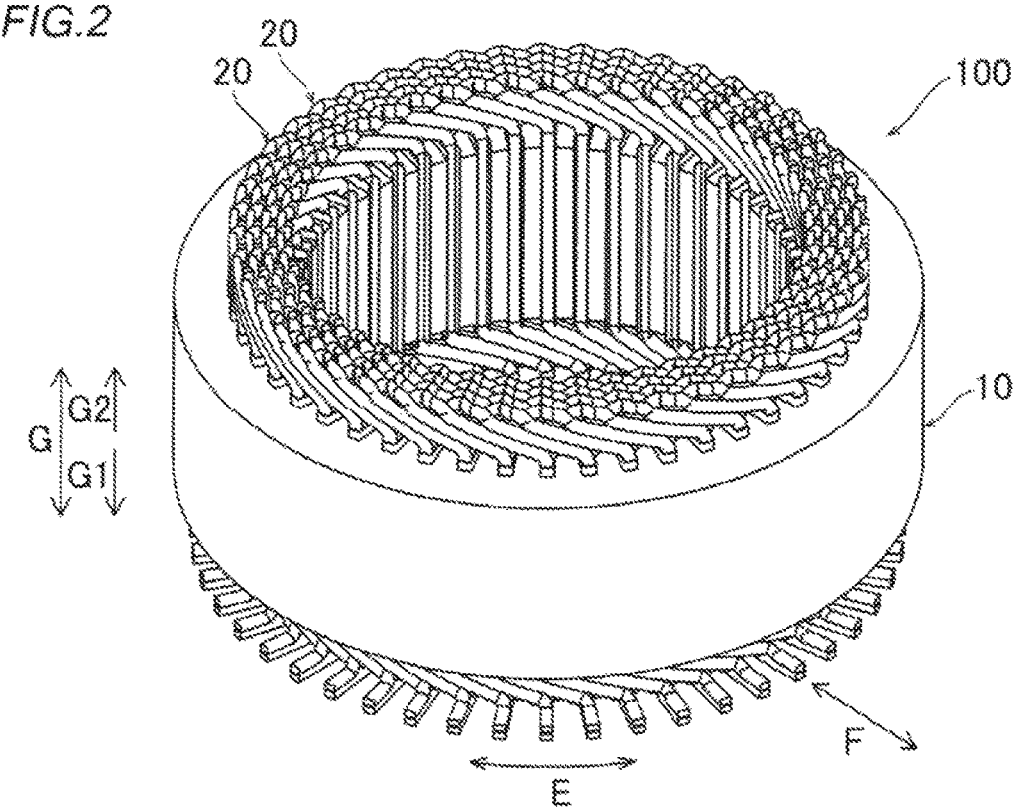
FIG. 2 is a perspective view of the stator according to the embodiment of the present disclosure.
Figure 3:
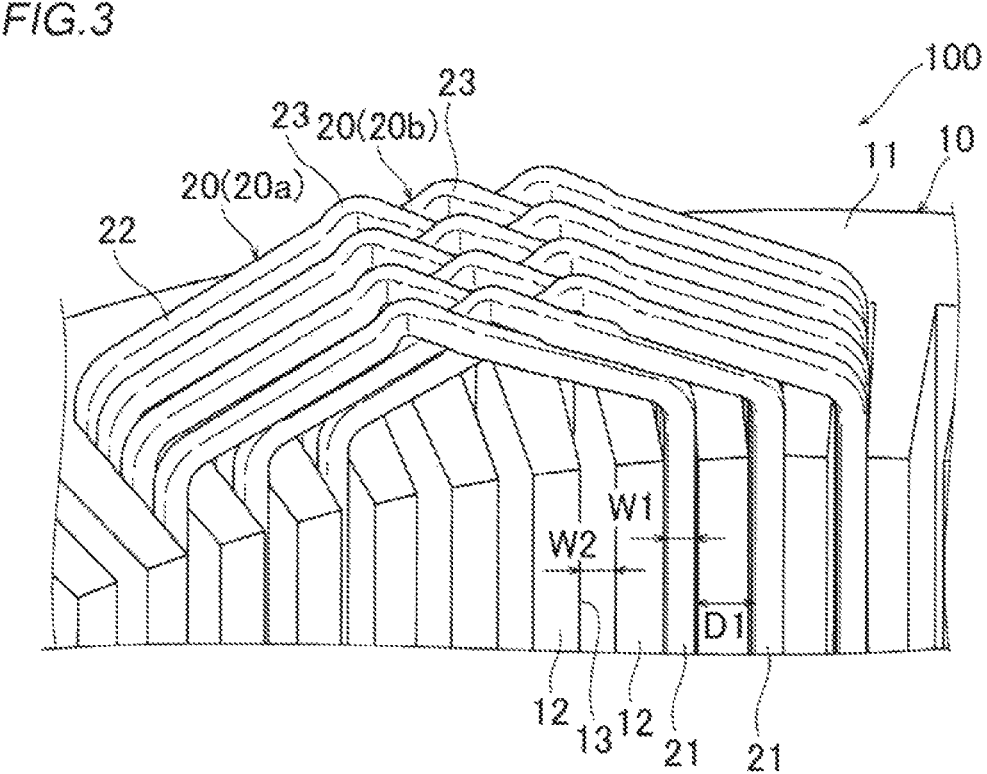
FIG. 3 is a partial enlarged view of FIG. 2.

As illustrated in FIGS. 1 to 3, the stator 100 includes a core 10 and coaxially wound coils 20. The coaxially wound coils 20 are an example of the "continuous coils." In the case where the stator 100 is applied to a three-phase AC motor, the coaxially wound coils 20 constitute any of a U-phase coil, a V-phase coil, and a W-phase coil.

In the specification of the present application, the term "circumferential direction" means the circumferential direction of the stator core 100 (E direction in FIGS. 1 and 2), and the term "radial direction" means the radial direction of the stator core 100 (F direction in FIGS. 1 and 2). That is, the term "radial direction" means a direction along a line that passes through the center of the stator core 100. The term "axial direction" means the direction of the rotational axis of the stator core 100 (G direction in FIGS. 1 and 2). The terms "one side in the axial direction" and "the other side in the axial direction" means one side of the stator core 100 in the axial direction (G1 direction in FIGS. 1 and 2) and the other side of the stator core 100 in the axial direction (G2 direction in FIGS. 1 and 2). The term "radially inner side" means the side in the direction toward the center of the stator core 100. The term "radially outer side" means the side in the direction from the center of the stator core 100 toward the outer side in the radial direction.

As illustrated in FIG. 3, the core 10 is formed by stacking annular steel sheets on each other. That is, the core 10 is not divided. A radially inner space to house a rotor (not illustrated) is formed on the radially inner side (inner side in the radial direction) of the core 10. The core 10 has a back yoke 11 formed in an annular shape, and a plurality of teeth 12 that extend from the back yoke 11 toward the inner side in the radial direction. The plurality of teeth 12 are provided to the core 10 at generally equal angular intervals in the circumferential direction. Slots 13 are formed between the teeth 12 which are adjacent to each other. A plurality of (e.g. 48) slots 13 are provided.

(Structure of Coaxially Wound Coil)

Figure 4:
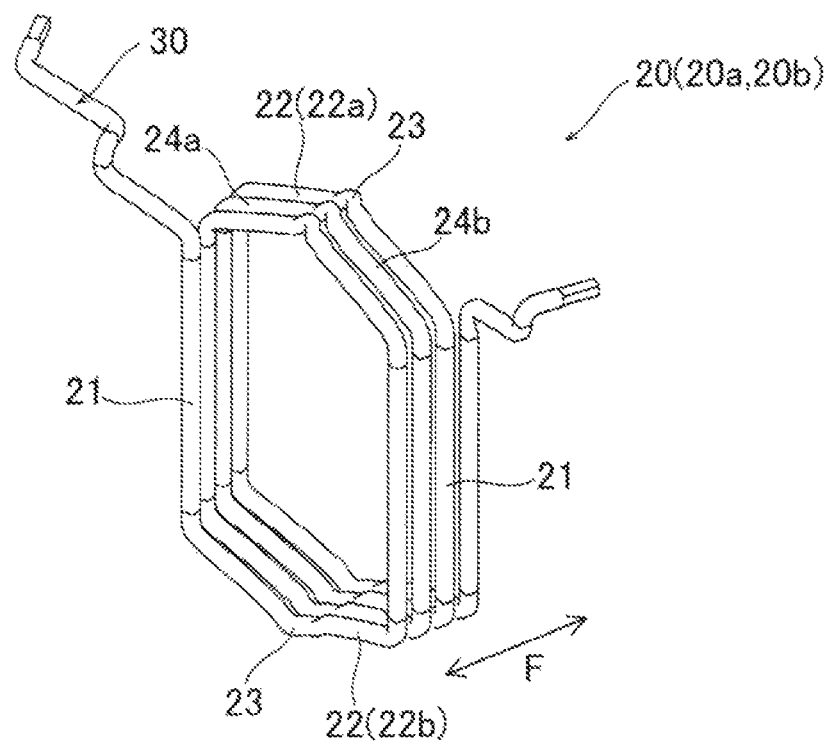
FIG. 4 is a perspective view of a coaxially wound coil according to the embodiment of the present disclosure.

As illustrated in FIG. 4, the coaxially wound coil 20 is formed by coaxially winding a single conductor wire 30 continuously a plurality of times. The coaxially wound coil 20 has: slot housed portions 21 housed in the slots 13 which are different from each other (a pair (plurality) of slot housed portions 21 provided on one side and the other side in the circumferential direction); a coil end portion 22 (coil end portion 22a) on one side in the axial direction that connects the pair of slot housed portions 21 to each other; and a coil end portion 22 (coil end portion 22b) on the other side in the axial direction that connects the pair of slot housed portions 21 to each other. That is, the coaxially wound coil 20 is formed by winding one conductor wire 30 a plurality of times without being joined by welding or the like. The coaxially wound coil 20 is housed in the slots 13 with the plurality of conductor wires 30, which constitute the coil end portion 22a on one side in the axial direction and the coil end portion 22b on the other side in the axial direction, stacked on each other along the radial direction.

As illustrated in FIGS. 4 and 5, the coil end portions 22 of the plurality of coaxially wound coils 20 are each provided with an offset portion 23 in which the conductor wire 30 is offset in the radial direction of the stator 100 by a width B corresponding to one conductor wire 30. Specifically, the conductor wire 30 which constitutes the coil end portion 22 has a first curved portion 24a provided on one side in the circumferential direction and curved arcuately in accordance with the arc of the core 10 which is annular, and a second curved portion 24b which is disposed on the inner side in the radial direction with respect to the first curved portion 24a by the width B corresponding to one conductor wire 30. The first curved portion 24a and the second curved portion 24b are connected to each other by the offset portion 23.

Figure 5A:
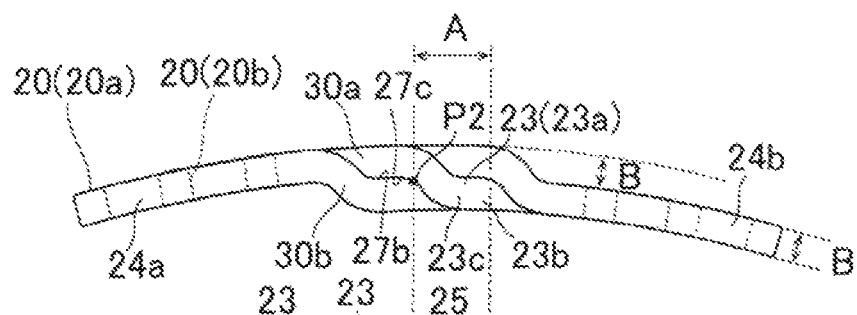
Figure 5B:
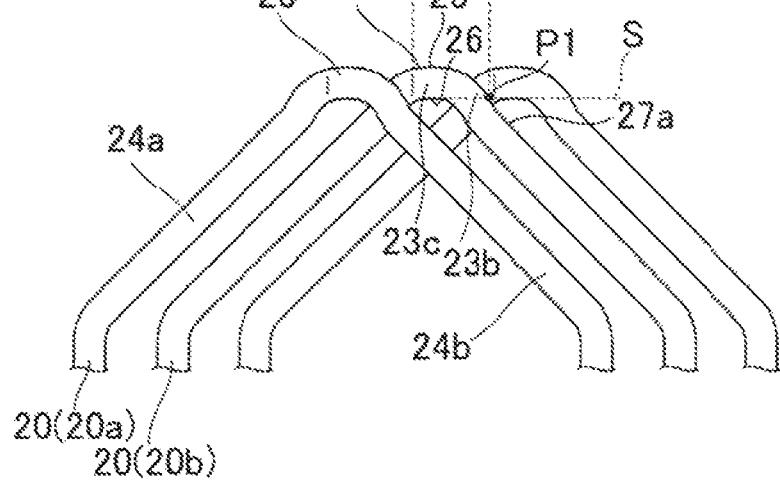

Specifically, as illustrated in FIG. 5B, the coil end portions 22 each have a top portion 25 that projects outward in the radial direction, and a flat portion 26 that is provided on the inner side in the axial direction with respect to the top portion 25 and that is generally flat along a direction that is orthogonal to the axial direction. One end of the offset portion 23 is a point (point P1) at which a plane S that passes through the flat portion 26 of the coil end portion 22 and that is orthogonal to the axial direction and a surface 27a of the conductor wire 30 on the outer side in the axial direction intersect each other as seen in the radial direction of the stator 100. Meanwhile, as illustrated in FIG. 5A, the other end of the offset portion 23 is a point (point P2) at which a surface 27b, on the radially outer side, of the conductor wire 30 (30b) which is adjacent on the inner side in the radial direction and a surface 27c of the conductor wire 30 (30a) on the radially inner side overlap each other as viewed in the axial direction. That is, the offset portion 23 includes a bent portion in which the conductor wire 30 is bent in the radial direction so as to be offset in the radial direction of the stator 100 by the width B corresponding to one conductor wire 30, and a portion in the vicinity of the bent portion.

As illustrated in FIG. 3, the coaxially wound coils 20 have a coaxially wound coil 20a and a coaxially wound coil 20b housed in the slots 13 which are adjacent to each other in the circumferential direction. The coaxially wound coil 20a and the coaxially wound coil 20b represent each of two coaxially wound coils 20 that are adjacent to each other in the circumferential direction, of the plurality of coaxially wound coils 20. The coaxially wound coil 20a and the coaxially wound coil 20b are respective examples of the "first continuous coil" and the "second continuous coil." Here, in the embodiment, a clearance D1 in the circumferential direction between the slot housed portion 21 of the coaxially wound coil 20a and the slot housed portion 21 of the coaxially wound coil 20b which are housed in the slots 13 which are adjacent to each other in the circumferential direction is larger than a clearance D2 (see FIGS. 6 and 7) in the circumferential direction between the slot housed portion 21 of the coaxially wound coil 20a and the slot housed portion 21 of the coaxially wound coil 20b before the coaxially wound coil 20a and the coaxially wound coil 20b are housed in the slots 13.

Figure 6:
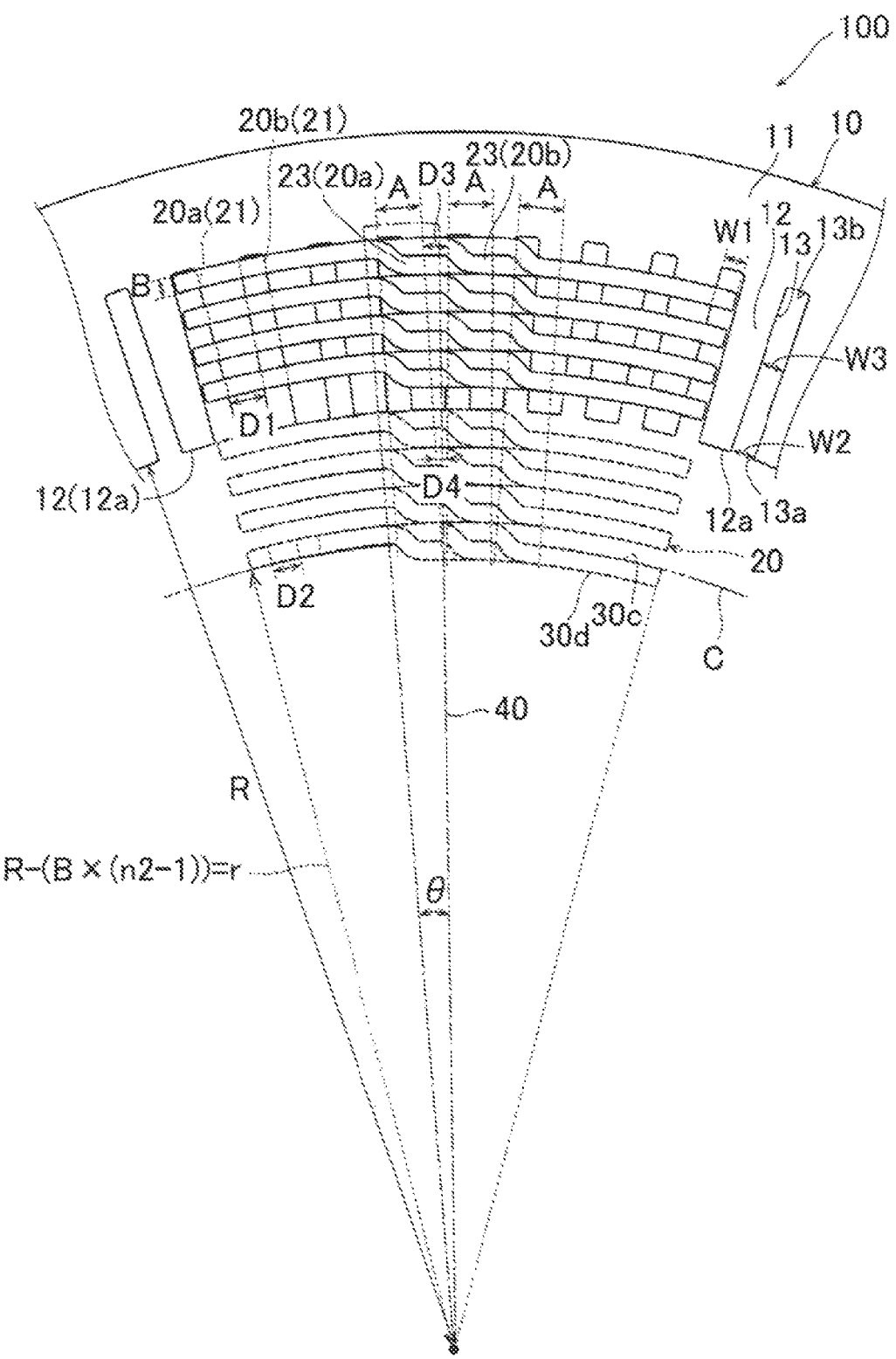
FIG. 6 illustrates states before and after the coaxially wound coil is inserted into the slots according to the embodiment of the present disclosure, as seen in the axial direction.

Specifically, as illustrated in FIG. 6, the plurality of coaxially wound coils 20 (the coaxially wound coil 20a and the coaxially wound coil 20b) are disposed on the radially inner side of the core 10 before being housed in the slots 13. The clearance D1 between the slot housed portions 21 with the plurality of coaxially wound coils 20 housed in the slots 13 is larger than the clearance D2 between the slot housed portions 21 with the plurality of coaxially wound coils 20 disposed on the radially inner side of the core 10.

In the embodiment, as illustrated in FIG. 6, a clearance D3 in the circumferential direction between the offset portion 23 of the coaxially wound coil 20a and the offset portion 23 of the coaxially wound coil 20b after the coaxially wound coil 20a and the coaxially wound coil 20b are housed in the slots 13 is larger than a clearance D4 in the circumferential direction between the offset portion 23 of the coaxially wound coil 20a and the offset portion 23 of the coaxially wound coil 20b before the coaxially wound coil 20a and the coaxially wound coil 20b are housed in the slots 13 (see the coaxially wound coils 20 indicated by the broken line in FIG. 6). That is, the clearance D3 between the offset portions 23 with the plurality of coaxially wound coils 20 housed in the slots 13 is larger than the clearance D4 between the offset portions 23 with the plurality of coaxially wound coils 20 disposed on the radially inner side of the core 10.

In the embodiment, in the case where the number of the slots 13 is defined as n1, each of the offset portions 23 has a width A in the circumferential direction within the range of a sector 40 centered on the center of the core 10 and having a center angle θ determined by the following formula (7) as viewed in the axial direction. In the case where the number of the slots 13 is 48, θ is 7.5 degrees (=360/48).

[Expression 8]

$$\theta = 360/n1 \quad (7)$$

Specifically, the coil end portions 22 of the coaxially wound coil 20 which is obtained by winding a single conductor wire 30 a plurality of times are provided with a plurality of offset portions 23, and all the plurality of offset portions 23 have the width A in the circumferential direction within the range of the sector 40 which has the center angle θ determined by the formula (7) given above. The plurality of offset portions 23 have a generally equal width A in the circumferential direction.

In the embodiment, in the case where the number of the slots 13 is defined as n1, each of the offset portions 23 before the coaxially wound coil 20a and the coaxially wound coil 20b are housed in the slots 13 also has the width A in the circumferential direction within the range of the sector 40 which is centered on the center of the core 10 and which has the center angle θ determined by the formula (7) given above as viewed in the axial direction.

In the embodiment, in the case where the distance from the center of the core 10 to end portions 12a of the teeth 12 on the radially inner side as viewed in the axial direction is defined as R, the width of the coil end portion 22 in the radial direction as viewed in the axial direction is defined as B, the number of the slots 13 is defined as n1, and the number of turns of the coaxially wound coils 20 which are disposed in the slots 13 is defined as n2, the width A of the offset portion 23 in the circumferential direction meets the following formula (8).

[Expression 9]

$$A \leq 2 \times \pi \times (R - (B \times (n2-1)))/n1 \quad (8)$$

Here, R−(B×(n2−1)) on the right side of the formula (8) given above represents the distance from the center of the core 10 to an end surface 30c, on the outer side in the radial direction, of the coil end portion 22 (conductor wire 30d) disposed on the innermost peripheral side of the coaxially wound coil 20a or the coaxially wound coil 20b as viewed in the axial direction for a case where the coil end portion 22 (conductor wire 30) on the outermost peripheral side of the coaxially wound coil 20 is in contact with the end portions 12a of the teeth 12 on the radially inner side (in the state of the coaxially wound coils 20 indicated by the broken line in FIG. 6). 2×π×(R−(B× (n2−1))) in the formula (8) given above represents the circumferential length of a circle C along the end surface 30c, on the outer side in the radial direction, of the coil end portion 22 (conductor wire 30d) disposed on the innermost peripheral side of the coaxially wound coil 20 for a case where the coil end portion 22 (conductor wire 30) on the outermost peripheral side of the coaxially wound coil 20 is in contact with the end portions 12a of the teeth 12 on the radially inner side (in the state of the coaxially wound coils 20 indicated by the broken line in FIG. 6).

In the embodiment, the width A of the offset portion 23 in the circumferential direction meets the following formula (9).

[Expression 10]

$$A \geq B \quad (9)$$

Here, in the case where the conductor wire 30 is offset in the radial direction of the stator 100 by the width B corresponding to one conductor wire 30 by bending the conductor wire 30 generally orthogonally, the width A of the offset portion 23 in the circumferential direction is equal to the width B. That is, B in the formula (8) given above represents the smallest value of the width A of the offset portion 23 in the circumferential direction.

In the embodiment, as illustrated in FIG. 5B, the conductor wire 30 is constituted from a rectangular conductive wire. An end portion 23b of the offset portion 23 in the circumferential direction is formed by bending the coil end portion 22, which is composed of a rectangular conductive wire, toward the outer side in the axial direction by edgewise bending. Meanwhile, as illustrated in FIG. 5A, a portion of the offset portion 23 in the vicinity of a center portion 23c in the circumferential direction is formed by bending the conductor wire 30 in the radial direction by flatwise bending so as to be offset (displaced) in the radial direction by the width B corresponding to one conductor wire 30 as viewed in the axial direction. As illustrated in FIG. 5B, the offset portion 23 of the coil end portion 22 is formed to be generally semicircular as seen in the radial direction. That is, the offset portion 23 is bent into a generally semicircular shape that projects upward at larger inclination angles (inclination angles that are close to the vertical) from the upper ends of a pair of inclined portions that extend as inclined toward the top portion 25 of the coil end portion 22 as seen in the radial direction. Because of work hardening due to the bending, the rigidity (difficulty of being deformed) of the offset portion 23 is improved compared to portions of the coil end portion 22 other than the offset portion 23. The edgewise bending refers to bending a rectangular conductive wire, which has a rectangular cross-sectional surface, using a short side of the rectangular conductive wire as the radially inner surface. Meanwhile, the flatwise bending refers to bending a rectangular conductive wire using a long side of the rectangular conductive wire as the radially inner surface.

In the embodiment, as illustrated in FIG. 6, a width W1 of the slot housed portion 21 in the circumferential direction is equal to or less than a width W2, in the circumferential direction, of an opening end 13a of the slot 13 on the radially inner side. The width W1 of the slot housed portion 21 in the circumferential direction is equal to or less than a width W3 of the slot 13 in the circumferential direction at each position in the radial direction. The slot housed portions 21 are covered by an insulating member (such as insulating paper), and the width W1, in the circumferential direction, of the slot housed portion 21 including the insulating member is equal to or less than the width W2, in the circumferential direction, of the opening end 13a (the width W3 of the slot 13 in the circumferential direction at each position in the radial direction).

(Effect of Structure According to Embodiment)

The following effects can be obtained with the embodiment.

In the embodiment, as described above, the clearance D1 in the circumferential direction between the slot housed portion 21 of the coaxially wound coil 20a and the slot housed portion 21 of the coaxially wound coil 20b after the coaxially wound coil 20a and the coaxially wound coil 20b are housed in the slots 13 is larger than the clearance D2 in the circumferential direction between the slot housed portion 21 of the coaxially wound coil 20a and the slot housed portion 21 of the coaxially wound coil 20b before the coaxially wound coil 20a and the coaxially wound coil 20b are housed in the slots 13. Consequently, the coaxially wound coil 20a and the coaxially wound coil 20b can be moved from the radially inner side toward the radially outer side to be inserted into the slots 13, which extend radially toward the radially outer side, while gradually increasing the clearance D1 in the circumferential direction between the slot housed portion 21 of the coaxially wound coil 20*a* and the slot housed portion 21 of the coaxially wound coil 20*b*. That is, the coaxially wound coil 20*a* and the coaxially wound coil 20*b* can be inserted into the slots 13 with the plurality of conductor wires 30, which constitute the coil end portion 22, stacked on each other along the radial direction without bending the coil end portions 22 of the coaxially wound coil 20*a* and the coaxially wound coil 20*b* so as to project toward the radially inner side of the stator 100. As a result, an increase in length of the coaxially wound coil 20*a* and the coaxially wound coil 20*b* in the axial direction can be prevented, and thus an increase in length of the stator 100 in the axial direction can be prevented.

In the embodiment, as described above, the clearance D3 in the circumferential direction between the offset portion 23 of the coaxially wound coil 20*a* and the offset portion 23 of the coaxially wound coil 20*b* is larger than the clearance D4 in the circumferential direction between the offset portion 23 of the coaxially wound coil 20*a* and the offset portion 23 of the coaxially wound coil 20*b* before the coaxially wound coil 20*a* and the coaxially wound coil 20*b* are housed in the slots 13. Consequently, the clearance D3 in the circumferential direction between the offset portion 23 of the coaxially wound coil 20*a* and the offset portion 23 of the coaxially wound coil 20*b* becomes larger (the offset portion 23 of the coaxially wound coil 20*a* and the offset portion 23 of the coaxially wound coil 20*b* are moved away from each other) when the coaxially wound coil 20*a* and the coaxially wound coil 20*b* are moved from the radially inner side toward the radially outer side to be housed in the slots 13, and thus interference between the offset portion 23 of the coaxially wound coil 20*a* and the offset portion 23 of the coaxially wound coil 20*b* can be prevented.

In the embodiment, a single conductor wire 30 is wound continuously to form the coaxially wound coil 20. Here, with a segment coil (a coil obtained by inserting a plurality of conductor wires in a generally U-shape into the slots 13, bending the conductor wires so as to be proximate to each other, and thereafter connecting the conductor wires to each other by welding), it is difficult to bend the conductor wires into a desired shape in bending the conductor wires so as to be proximate to each other. Therefore, the length of the segment coil in the axial direction may be increased. Meanwhile, the coaxially wound coil 20 according to the embodiment is formed by winding the conductor wire 30 around a coil form, and thus the coaxially wound coil 20 is easily formed into a desired shape. Consequently, an increase in length in the axial direction due to a failure to form the coaxially wound coil 20 into a desired shape can be suppressed.

In the embodiment, the core 10 is formed by stacking annular steel sheets on each other. That is, the core 10 is not divided. Here, in the divided core, the loss of the magnetic field is increased on joint surfaces (magnetic paths) on which sections of the divided core are joined to each other. The sections of the divided core are joined to each other by a shrink fit ring. In this event, the diameter of the core is reduced. Since the core 10 according to the embodiment is not divided, on the other hand, an increase in loss of the magnetic field and a reduction in diameter of the core 10 can be prevented.

In the embodiment, as described above, in the case where the number of the slots 13 is defined as n1, each of the offset portions 23 has the width A in the circumferential direction within the range of the sector 40 which is centered on the center of the core 10 and which has the center angle θ determined by the formula (7) given above as viewed in the axial direction. Consequently, each of the offset portions 23 is disposed on the circumference of a circle with a radius corresponding to the distance from the center of the core 10 to each of the offset portions 23, and in a range with a length obtained by dividing the circumference by the number of the slots 13 (the number of the offset portions 23 which are positioned on the circumference). That is, each of the offset portions 23 is disposed in such a range that the plurality of offset portions 23 which are positioned on one circumference do not interfere with each other. Consequently, interference between the offset portion 23 of the coaxially wound coil 20*a* and the offset portion 23 of the coaxially wound coil 20*b* on one circumference can be prevented.

In the embodiment, in the case where the number of the slots 13 is defined as n1, each of the offset portions 23 before the coaxially wound coil 20*a* and the coaxially wound coil 20*b* are housed in the slots 13 also has the width A in the circumferential direction within the range of the sector 40 which is centered on the center of the core 10 and which has the center angle θ determined by the formula (7) given above as viewed in the axial direction. Consequently, interference between the offset portion 23 of the coaxially wound coil 20*a* and the offset portion 23 of the coaxially wound coil 20*b* on one circumference can be prevented also before the coaxially wound coil 20*a* and the coaxially wound coil 20*b* are housed in the slots 13.

In the embodiment, as described above, in the case where the distance from the center of the core 10 to the end portions 12*a* of the teeth 12 on the radially inner side as viewed in the axial direction is defined as R, the width of the coil end portion 22 in the radial direction as viewed in the axial direction is defined as B, the number of the slots 13 is defined as n1, and the number of turns of the coaxially wound coils 20 which are disposed in the slots 13 is defined as n2, the width A of the offset portions 23 in the circumferential direction meets the following formula (8). Here, $R-(B\times(n2-1))$ on the right side of the formula (8) given above represents the distance from the center of the core 10 to the end surface 30*c*, on the outer side in the radial direction, of the coil end portion 22 (conductor wire 30*d*) disposed on the innermost peripheral side of the coaxially wound coil 20*a* or the coaxially wound coil 20*b* as viewed in the axial direction with the coaxially wound coil 20*a* and the coaxially wound coil 20*b* disposed on the radially inner side of the core 10. Meanwhile, the right side of the formula (8) given above indicates that the offset portion 23 disposed on the innermost peripheral side is disposed in a range with a length obtained by dividing the circumference of the circle C with a radius corresponding to the distance from the center of the core 10 to the end surface 30*c*, on the outer side in the radial direction, of the coil end portion 22 (conductor wire 30*d*) disposed on the innermost peripheral side by the number of the slots 13. That is, by meeting the formula (8) given above, interference between the offset portion 23 of the coaxially wound coil 20*a* and the offset portion 23 of the coaxially wound coil 20*b* can be prevented also in a state in which the offset portion 23 is disposed on the innermost peripheral side (in a state in which the offset portion 23 of the coaxially wound coil 20*a* and the offset portion 23 of the coaxially wound coil 20*b* are the most proximate to each other).

In the embodiment, as described above, the width A of the offset portion 23 in the circumferential direction meets the following formula (9). Here, in the case where the offset portion 23 is offset by the width B corresponding to one conductor wire 30 at an angle of about 90°, the width A of the offset portion 23 in the circumferential direction is smallest. In this case, the width A in the circumferential direction is equal to the width B of one conductor wire 30. That is, with the width A of the offset portion 23 in the circumferential direction meeting the formula (9) given above, interference between the offset portion 23 of the coaxially wound coil 20a and the offset portion 23 of the coaxially wound coil 20b can be prevented also in a state in which the width A of the offset portion 23 in the circumferential direction is smallest.

In the embodiment, as described above, the conductor wire 30 is composed of a rectangular conductive wire, the end portion 23b of the offset portion 23 in the circumferential direction is formed by bending the coil end portion 22, which is composed of a rectangular conductive wire, toward the outer side in the axial direction by edgewise bending, and a portion of the offset portion 23 in the vicinity of the center portion 23c in the circumferential direction is formed by bending the conductor wire 30 in the radial direction by flatwise bending so as to be offset in the radial direction by a width corresponding to one conductor wire 30 as viewed in the axial direction. Consequently, because of work hardening due to the edgewise bending of the end portion 23b of the offset portion 23 in the circumferential direction and the flatwise bending of a portion of the offset portion 23 in the vicinity of the center portion 23c in the circumferential direction, the offset portion 23 can be prevented from being deformed (widened in the circumferential direction) in inserting the coaxially wound coil 20a and the coaxially wound coil 20b into the slots 13. As a result, interference between the offset portion 23 of the coaxially wound coil 20a and the offset portion 23 of the coaxially wound coil 20b can be prevented effectively.

In the embodiment, as described above, the width W1 of the slot housed portion 21 in the circumferential direction is equal to or less than the width W2, in the circumferential direction, of the opening end 13a of the slot 13 on the radially inner side. Consequently, the coaxially wound coil 20a and the coaxially wound coil 20b can be easily inserted into the slots 13 while avoiding a collision between the coaxially wound coil 20a and the end portions 12a of the teeth 12 on the radially inner side.

In the embodiment, as described above, the width W1 of the slot housed portion 21 in the circumferential direction is equal to or less than the width W3 of the slot 13 in the circumferential direction at each position in the radial direction. Consequently, the coaxially wound coil 20a and the coaxially wound coil 20b can be easily inserted to outer peripheral ends 13b (see FIG. 6) of the slots 13.

(Method of Manufacturing Stator)

Next, a method of manufacturing the stator 100 according to the embodiment will be described with reference to FIGS. 6 and 7.

<Preparation of Coaxially Wound Coils>

First, a plurality of coaxially wound coils 20 such as those described above are prepared. That is, a plurality of coaxially wound coils 20 (a coaxially wound coil 20a and a coaxially wound coil 20b) are prepared which are each continuously formed by a single conductor wire 30 and each include slot housed portions 21 to be housed in the slots 13, a coil end portion 22 on one side in the axial direction that connects the slot housed portions 21 to each other and that has an offset portion 23 in which the conductor wire 30 is offset in the radial direction of the stator 100 by the width B corresponding to one conductor wire 30, and a coil end portion 22 on the other side that connects the slot housed portions 21 to each other. A coil assembly (not illustrated) in which the plurality of coaxially wound coils 20 are disposed in an annular arrangement is formed.

<Step of Disposing Coaxially Wound Coils>

Figure 7:
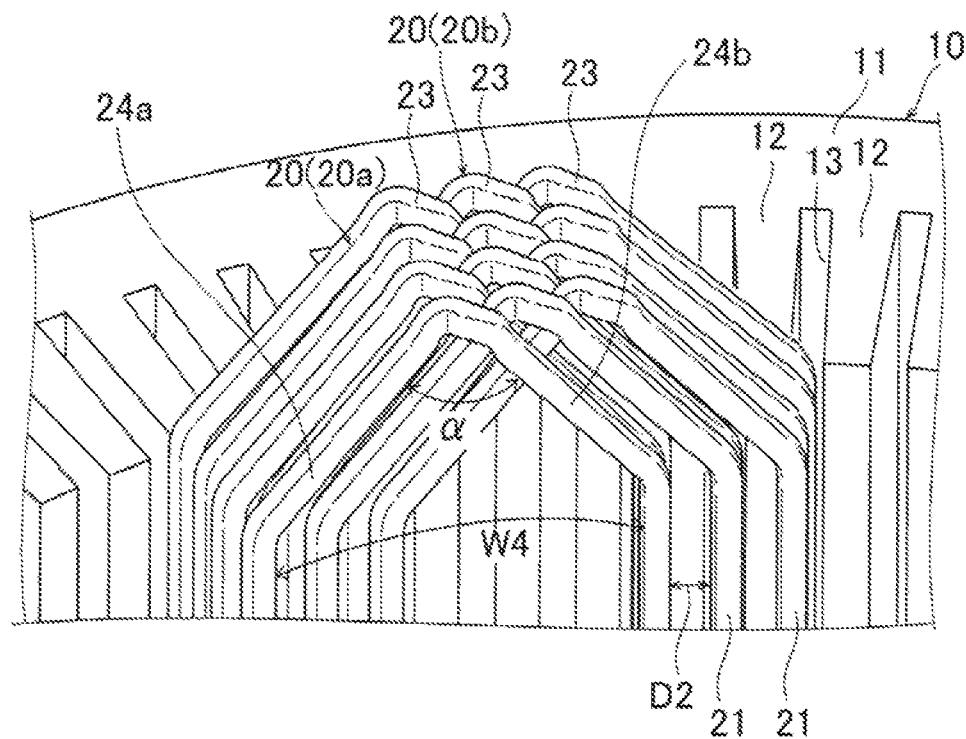
FIG. 7 is a perspective view illustrating a state before the coaxially wound coil is inserted into the slots according to the embodiment of the present disclosure.

Next, as illustrated in FIGS. 6 and 7, the plurality of coaxially wound coils 20 (the coaxially wound coil 20a and the coaxially wound coil 20b) are disposed on the radially inner side of the core 10 which has been formed by stacking annular steel sheets on each other and which has teeth 12 and slots 13 provided between the teeth 12.

Here, in the embodiment, as illustrated in FIG. 6, in the case where the distance from the center of the core 10 to the end surface 30c, on the outer side in the radial direction, of the coil end portion 22 (conductor wire 30d) disposed on the innermost peripheral side of the coaxially wound coil 20a or the coaxially wound coil 20b as viewed in the axial direction with the coaxially wound coil 20a and the coaxially wound coil 20b disposed on the radially inner side of the core 10 (see the coaxially wound coils 20 indicated by the broken line in FIG. 6) is defined as r and the number of slots is defined as n, the width A of the offset portion 23 in the circumferential direction meets the following formula (10).

[Expression 11]

$$A \leq 2 \times \pi \times r/n \quad (10)$$

With the coaxially wound coil 20a and the coaxially wound coil 20b disposed on the radially inner side of the core 10, the width A of the offset portion 23 in the circumferential direction meets the following formula (11).

[Expression 12]

$$A \geq B \quad (11)$$

<Step of Inserting Coaxially Wound Coils>

Next, the plurality of coaxially wound coils 20 (the coaxially wound coil 20a and the coaxially wound coil 20b) are moved from the radially inner side toward the radially outer side to be inserted into the slots 13 which are adjacent to each other in the circumferential direction. Here, in the embodiment, in the case where the number of the slots is defined as n, the plurality of coaxially wound coils 20 are inserted into the slots 13 while maintaining a state in which the overall width of the offset portion 23 is disposed in the range of the sector 40 which is centered on the center of the core 10 and which has the center angle θ determined by the following formula (12) as viewed in the axial direction.

[Expression 13]

$$\theta = 360/n \quad (12)$$

In the embodiment, the clearance D1 in the circumferential direction between the slot housed portion 21 of the coaxially wound coil 20a and the slot housed portion 21 of the coaxially wound coil 20b after the coaxially wound coil 20a and the coaxially wound coil 20b are housed in the slots 13 is larger than the clearance D2 in the circumferential direction between the slot housed portion 21 of the coaxially wound coil 20a and the slot housed portion 21 of the coaxially wound coil 20b before the coaxially wound coil 20a and the coaxially wound coil 20b are housed in the slots 13. That is, the plurality of coaxially wound coils 20 (the coaxially wound coil 20a and the coaxially wound coil 20b) are moved from the radially inner side toward the radially outer side so that the plurality of coaxially wound coils 20 are inserted into the slots 13 while gradually increasing the clearance D1 in the circumferential direction between the slot housed portion 21 of the coaxially wound coil 20a and the slot housed portion 21 of the coaxially wound coil 20b.

In this event, when the coaxially wound coils 20 are moved from the radially inner side toward the radially outer side, the coaxially wound coils 20 are deformed such that a width W4 (see FIG. 7), in the circumferential direction, between the slot housed portions 21 of one coaxially wound coil 20 on one side and on the other side in the circumferential direction becomes gradually larger. When the coaxially wound coils 20 are moved from the radially inner side toward the radially outer side, the coaxially wound coils 20 are each deformed such that an angle α formed by the first curved portion 24a and the second curved portion 24b becomes gradually larger. Meanwhile, the offset portion 23 is not substantially deformed since the end portion 23b of the offset portion 23 has been formed (work-hardened) by edgewise bending. That is, the width A of the offset portion 23 in the circumferential direction is not substantially varied (increased). Consequently, the offset portion 23 of the coaxially wound coil 20 is prevented from being widened in the circumferential direction (such widening is reduced) when the plurality of coaxially wound coils 20 are inserted into the slots 13, and the overall width of the offset portion 23 is disposed in the range of the sector 40 which has the center angle θ determined by the formula (12) given above. Consequently, interference (a collision) between the offset portions 23 due to widening of the offset portion 23 in the circumferential direction is prevented.

(Effect of Manufacturing Method According to Embodiment)

The following effects can be obtained with the embodiment.

In the embodiment, as described above, the manufacturing method includes the step of moving the coaxially wound coil 20a and the coaxially wound coil 20b from the radially inner side toward the radially outer side to be inserted into the slots 13 which are adjacent to each other in the circumferential direction such that the clearance D1 in the circumferential direction between the slot housed portions 21 after the coaxially wound coil 20a and the coaxially wound coil 20b are housed in the slots 13 is larger than the clearance D2 in the circumferential direction between the slot housed portions 21 before the coaxially wound coil 20a and the coaxially wound coil 20b are housed in the slots 13. Consequently, the coaxially wound coil 20a and the coaxially wound coil 20b can be inserted into the slots 13 without bending the coil end portions 22 of the coaxially wound coil 20a and the coaxially wound coil 20b so as to project toward the radially inner side of the stator 100. As a result, an increase in length of the coaxially wound coil 20a and the coaxially wound coil 20b in the axial direction can be prevented, and thus an increase in length of the stator 100 in the axial direction can be prevented.

In the embodiment, as described above, in the step of disposing the coaxially wound coil 20a and the coaxially wound coil 20b on the radially inner side of the core 10, the width A of the offset portion 23 in the circumferential direction meets the formula (10) given above in the case where the length from the center of the core 10 to the end surface 30c, on the outer side in the radial direction, of the coil end portion 22 disposed on the innermost peripheral side of the coaxially wound coil 20a or the coaxially wound coil 20b as viewed in the axial direction with the coaxially wound coil 20a and the coaxially wound coil 20b disposed on the radially inner side of the core 10 is defined as r. Consequently, interference between the offset portion 23 of the coaxially wound coil 20a and the offset portion 23 of the coaxially wound coil 20b can be prevented also in a state in which the coaxially wound coil 20a and the coaxially wound coil 20b are disposed on the radially inner side of the core 10 (in a state in which the offset portion 23 of the coaxially wound coil 20a and the offset portion 23 of the coaxially wound coil 20b are most proximate to each other).

[Modification]

The embodiment disclosed herein should be considered as exemplary and non-limiting in all respects.

Figure 8:
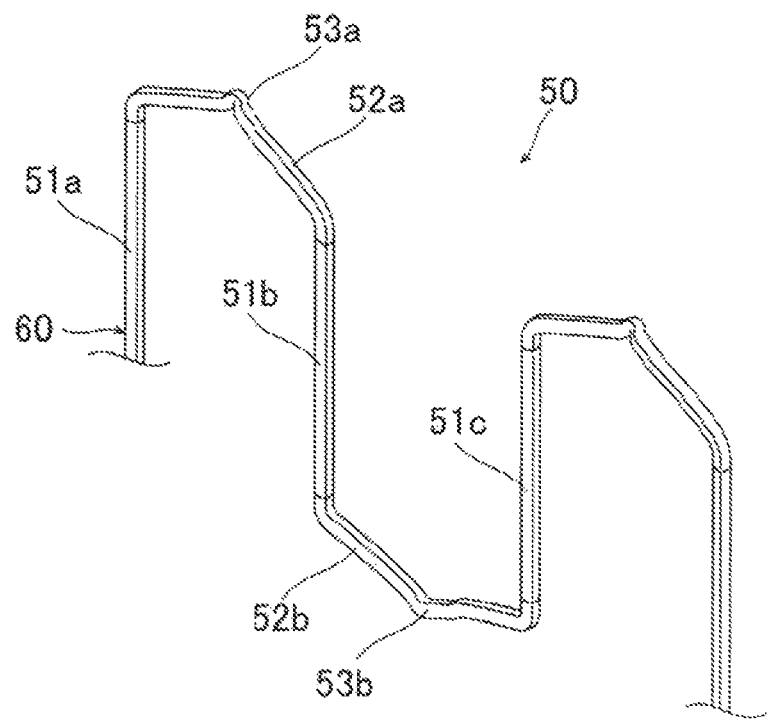
FIG. 8 is a perspective view of a wave wound coil according to a modification of the embodiment of the present disclosure.

For example, in the embodiment described above, coaxially wound coils each formed by continuously winding a single conductor wire are used. However, the present disclosure is not limited thereto. For example, as illustrated in FIG. 8, wave wound coils 50 each formed continuously from a single conductor wire 60 may also be used. The wave wound coil 50 has: slot housed portions 51a, 51b, and 51c housed in the slots 13 which are different from each other a coil end portion 52a on one side in the axial direction that connects the slot housed portions 51a and 51b to each other; and a coil end portion 52b on the other side in the axial direction that connects the slot housed portions 51b and 51c to each other. That is, the wave wound coil 50 is formed from one conductor wire 60 without being joined by welding or the like. The coil end portions 52a and 52b are provided with offset portions 53a and 53b, respectively, in which the conductor wire 60 is offset in the radial direction of the stator 100 by a width corresponding to one conductor wire 60. The wave wound coils 50 are an example of the "continuous coils."

In the embodiment described above, the coaxially wound coils are each formed by continuously winding a conductor wire which is composed of a rectangular conductive wire. However, the present disclosure is not limited thereto. For example, the coils may be each formed by continuously winding a conductor wire other than a rectangular conductive wire. Specifically, the coils may be each formed from a round wire or a conductor wire with an elliptical cross-sectional surface.

In the embodiment described above, an end portion of the offset portion in the circumferential direction is formed by edgewise bending, and a portion of the offset portion in the vicinity of the center portion in the circumferential direction is formed by flatwise bending. However, the present disclosure is not limited thereto. For example, an end portion of the offset portion in the circumferential direction and portions of the offset portions in the vicinity of the center portion may be formed by a method other than edgewise bending or flatwise bending.

In the embodiment described above, the width of the offset portion in the circumferential direction is not substantially varied when moving the coaxially wound coils from the radially inner side toward the radially outer side to be inserted into the slots. However, the present disclosure is not limited thereto. For example, the width of the offset portion in the circumferential direction may be varied (increased) in moving the coaxially wound coils from the radially inner side toward the radially outer side to be inserted into the slots as long as the width of the offset portion in the circumferential direction meets the formula (8) or the formula (10) given above.

The invention claimed is:

1. A stator comprising:
  a core formed by stacking annular steel sheets on each other and having teeth and slots provided between the teeth; and
  a plurality of continuous coils each continuously formed from a single conductor wire and each having a plurality of slot housed portions to be housed in the slots that are different from each other, a coil end portion on one side in an axial direction that connects the slot housed portions to each other, and a coil end portion on the other side in the axial direction that connects the slot housed portions to each other, wherein:

the coil end portion of a first continuous coil and the coil end portion of a second continuous coil to be housed in the slots that are adjacent to each other in a circumferential direction, of the plurality of continuous coils, are each provided with an offset portion in which the conductor wire is bent in a radial direction of the stator so as to be offset in the radial direction by a width corresponding to one conductor wire;

a clearance in the circumferential direction between the slot housed portion of the first continuous coil and the slot housed portion of the second continuous coil after the first continuous coil and the second continuous coil are housed in the slots is larger than a clearance in the circumferential direction between the slot housed portion of the first continuous coil and the slot housed portion of the second continuous coil before the first continuous coil and the second continuous coil are housed in the slots; and in the case where a length from a center of the core to end portions of the teeth on a radially inner side as viewed in the axial direction is defined as R, a width of the coil end portion in the radial direction as viewed in the axial direction is defined as B, the number of the slots is defined as n1, and the number of turns of the continuous coils that are disposed in the slots is defined as n2, a width A of the offset portion in the circumferential direction meets the following formula (2):

$$A \leq 2 \times \pi \times (R - (B \times (n2-1)))/n1 \qquad (2).$$

2. The stator according to claim 1, wherein a clearance in the circumferential direction between the offset portion of the first continuous coil and the offset portion of the second continuous coil is larger than a clearance in the circumferential direction between the offset portion of the first continuous coil and the offset portion of the second continuous coil before the first continuous coil and the second continuous coil are housed in the slots.

3. The stator according to claim 2, wherein in the case where the number of the slots is defined as n1, each of the offset portions has a width in the circumferential direction within a range of a sector centered on a center of the core and having a center angle θ determined by the following formula (1) as viewed in the axial direction:

$$\theta = 360/n1 \qquad (1).$$

4. The stator according to claim 3, wherein each of the offset portions before the first continuous coil and the second continuous coil are housed in the slots has a width in the circumferential direction within the range of the sector that is centered on the center of the core and that has the center angle θ determined by the formula (1) as viewed in the axial direction.

5. The stator according to claim 1, wherein the width A of the offset portion in the circumferential direction meets the following formula (3):

$$A \geq B \qquad (3).$$

6. The stator according to claim 5, wherein:
the conductor wire is composed of a rectangular conductive wire; and
an end portion of the offset portion in the circumferential direction is formed by bending the coil end portion, which is composed of the rectangular conductive wire, toward an outer side in the axial direction by edgewise bending, and a portion of the offset portion in the vicinity of a center portion in the circumferential direction is formed by bending the conductor wire in the radial direction by flatwise bending so as to be offset in the radial direction by the width corresponding to one conductor wire as viewed in the axial direction.

7. The stator according to claim 6, wherein a width of the slot housed portion in the circumferential direction is equal to or less than a width, in the circumferential direction, of an opening end of the slot on a radially inner side.

8. The stator according to claim 7, wherein the width of the slot housed portion in the circumferential direction is equal to or less than a width of the slot in the circumferential direction at each position in the radial direction.

9. The stator according to claim 1, wherein:
the conductor wire is composed of a rectangular conductive wire; and
an end portion of the offset portion in the circumferential direction is formed by bending the coil end portion, which is composed of the rectangular conductive wire, toward an outer side in the axial direction by edgewise bending, and a portion of the offset portion in the vicinity of a center portion in the circumferential direction is formed by bending the conductor wire in the radial direction by flatwise bending so as to be offset in the radial direction by the width corresponding to one conductor wire as viewed in the axial direction.

10. The stator according to claim 1, wherein a width of the slot housed portion in the circumferential direction is equal to or less than a width, in the circumferential direction, of an opening end of the slot on a radially inner side.

11. A method of manufacturing a stator, comprising the steps of:

disposing a first continuous coil and a second continuous coil on a radially inner side of a core, the core being formed by stacking annular steel sheets on each other and having teeth and slots provided between the teeth, the first continuous coil and the second continuous coil each being continuously formed from a single conductor wire to be housed in the slots that are adjacent to each other in a circumferential direction and each including a plurality of slot housed portions to be housed in the slots that are different from each other, a coil end portion on one side in an axial direction that connects the slot housed portions to each other, and a coil end portion on the other side in the axial direction that connects the slot housed portions to each other, and the coil end portions each being provided with an offset portion in which the conductor wire is bent in a radial direction of the stator so as to be offset in the radial direction by a width corresponding to one conductor wire; and moving the first continuous coil and the second continuous coil from the radially inner side toward a radially outer side to be inserted into the slots that are adjacent to each other in the circumferential direction such that a clearance in the circumferential direction between the slot housed portion of the first continuous coil and the slot housed portion of the second continuous coil after the first continuous coil and the second continuous coil are housed in the slots is larger than a clearance in the circumferential direction between the slot housed portion of the first continuous coil and the slot housed portion of the second continuous coil before the first continuous coil and the second continuous coil are housed in the slots, while maintaining a state in which an overall width of the offset portion is disposed in a range of a sector centered on a center of the core and having a center angle θ determined by the following formula (4) as viewed in the axial direction in the case where the number of the slots is defined as n:

$$\theta = 360/n \qquad (4)$$

wherein the step of disposing the first continuous coil and the second continuous coil on the radially inner side of the core is configured such that, in the case where a length from the center of the core to an end surface, on an outer side in the radial direction, of the coil end portion disposed on an innermost peripheral side of the first continuous coil or the second continuous coil as viewed in the axial direction with the first continuous coil and the second continuous coil disposed on the radially inner side of the core is defined as r, a width A of the offset portion in the circumferential direction meets the following formula (5):

$$A \leq 2 \times \Pi \times r/n \qquad (5).$$

* * * * *